United States Patent
Colelli et al.

(10) Patent No.: US 12,069,517 B2
(45) Date of Patent: Aug. 20, 2024

(54) TRANSFERRING CALLS VIA NEAR FIELD COMMUNICATIONS

(71) Applicant: Xerox Corporation, Norwalk, CT (US)

(72) Inventors: Dianne Colelli, Webster, NY (US); Cheryl A. Nazzaro, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 296 days.

(21) Appl. No.: 17/479,936

(22) Filed: Sep. 20, 2021

(65) Prior Publication Data

US 2023/0087269 A1   Mar. 23, 2023

(51) Int. Cl.
| | |
|---|---|
| *H04W 36/00* | (2009.01) |
| *H04M 7/00* | (2006.01) |
| *H04W 4/80* | (2018.01) |
| *H04W 76/16* | (2018.01) |

(52) U.S. Cl.
CPC ....... *H04W 36/0022* (2013.01); *H04M 7/006* (2013.01); *H04W 4/80* (2018.02); *H04W 76/16* (2018.02)

(58) Field of Classification Search
CPC ....... H04W 36/00; H04W 4/80; H04W 76/16; H04W 7/00
See application file for complete search history.

(56) References Cited

U.S. PATENT DOCUMENTS

| | | | | |
|---|---|---|---|---|
| 8,639,230 | B2 * | 1/2014 | Williams | H04M 3/58 455/445 |
| 8,941,850 | B2 * | 1/2015 | Sato | G06F 3/1206 709/227 |
| 9,036,169 | B2 * | 5/2015 | Park | H04N 1/00214 707/622 |
| 9,392,499 | B2 | 7/2016 | Sylvain | |
| 9,537,808 | B1 * | 1/2017 | Giansiracusa | H04L 51/18 |
| 9,571,995 | B1 * | 2/2017 | Scheer | H04W 4/16 |
| 9,898,168 | B2 * | 2/2018 | Shapiro | H04L 12/2829 |
| 2007/0283157 | A1 * | 12/2007 | Yami | H04N 1/4433 713/173 |

(Continued)

FOREIGN PATENT DOCUMENTS

GB    2478972 A    9/2011

*Primary Examiner* — Ayaz R Sheikh
*Assistant Examiner* — Mang Boi Thawng
(74) *Attorney, Agent, or Firm* — Tong, Rea, Bentley & Kim, LLC (57) ABSTRACT

An apparatus is disclosed. For example, the apparatus includes a first communication interface to establish a first communication path with a first endpoint device, a second communication interface to establish a second communication path with a second endpoint device, wherein the second endpoint device is to establish a voice call with the first endpoint device, a processor, and a non-transitory computer-readable medium storing a plurality of instructions. The instructions when executed by the processor cause the processor to detect a request to transfer the second communication path from the second endpoint device to a third endpoint device, wherein the request includes information obtained by the third endpoint device via near field communications (NFC) with the second endpoint device and transfer the second communication path from the second endpoint device to the third endpoint device to disconnect the second endpoint device.

12 Claims, 6 Drawing Sheets

(56) References Cited

U.S. PATENT DOCUMENTS

| | | | |
|---|---|---|---|
| 2012/0192077 A1* | 7/2012 | Castellani | H04N 1/00029 |
| | | | 715/740 |
| 2013/0115932 A1* | 5/2013 | Williams | H04M 3/58 |
| | | | 455/417 |
| 2014/0369481 A1* | 12/2014 | Naito | H04N 1/32723 |
| | | | 379/100.16 |
| 2016/0127585 A1* | 5/2016 | Wang | H04N 1/00474 |
| | | | 358/405 |
| 2017/0302823 A1* | 10/2017 | Saito | H04N 1/4433 |
| 2018/0020120 A1* | 1/2018 | Yamada | H04N 1/4406 |
| 2019/0069173 A1* | 2/2019 | Fukushima | H04L 63/0823 |
| 2019/0149675 A1* | 5/2019 | Kodimer | G10L 15/22 |
| | | | 358/1.13 |
| 2019/0306327 A1* | 10/2019 | Matysiak | G06F 3/167 |
| 2022/0232139 A1* | 7/2022 | Dasaraju | H04N 1/00854 |

* cited by examiner

TRANSFERRING CALLS VIA NEAR FIELD COMMUNICATIONS

The present disclosure relates generally to voice communications, and relates more particularly to a method and apparatus to transfer calls with near field communications (NFC).

BACKGROUND

Callers can use various devices to make telephone calls. However, in some instances, a caller may want to transfer a call to another device. For example, a caller may be on hold for a long time and want to transfer his or her call to another device without losing his or her place in line. In other examples, a user may be talking to a family member and not want to pass his or her mobile phone around to other household members to speak with the family member. Doing so may monopolize a user's mobile phone and prevent the user from using his or her mobile phone to make other calls.

SUMMARY

According to aspects illustrated herein, there are provided an apparatus and a method for transferring calls with near field communications. One disclosed feature of the embodiments is an apparatus that comprises a first communication interface to establish a first communication path with a first endpoint device, a second communication interface to establish a second communication path with a second endpoint device, wherein the second endpoint device is to establish a voice call with the first endpoint device via the first communication path and the second communication path, a processor, and a non-transitory computer-readable medium storing a plurality of instructions. The instructions when executed by the processor cause the processor to detect a request to transfer the second communication path from the second endpoint device to a third endpoint device, wherein the request includes information obtained by the third endpoint device via near field communication (NFC) with the second endpoint device and transfer the second communication path from the second endpoint device to the third endpoint device to disconnect the second endpoint device.

Another disclosed feature is a method for transferring calls with NFC. The method executed by a processor of the apparatus comprises a establishing a first communication path between the apparatus and a first endpoint device, establishing a second communication path between the apparatus and a second endpoint device, wherein the second endpoint device is to establish a voice call with the first endpoint device via the first communication path and the second communication path, detecting a request to transfer the second communication path from the second endpoint device to a third endpoint device, wherein the request includes information obtained by the third endpoint device via near field communications (NFC) with the second endpoint device, and transferring the second communication path from the second endpoint device to the third endpoint device to disconnect the second endpoint device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for transferring calls with NFC. As discussed above, a caller may want to transfer a call to another device. For example, a caller may be on hold for a long time and want to transfer his or her call to another device without losing his or her place in line. In other examples, a user may be talking to a family member and not want to pass his or her mobile phone around to other household members to speak with the family member. Doing so may monopolize a user's mobile phone and prevent the user from using his or her mobile phone to make other calls.

In another example, a field technician may be on a customer site to fix a problem with an apparatus or multi-function device (MFD). The field technician may be speaking with an IT support to help resolve the error. However, the field technician may have to leave. Another field technician may come in to replace the first field technician on the call. The second field technician may have to separately dial the IT support number and wait in the queue on hold before speaking with a live person.

The present disclosure provides the ability for users to quickly transfer calls with an NFC transfer call function on the mobile endpoint devices. The apparatus that is being serviced may be used as an intermediate device for the voice call between endpoint devices (e.g., a voice call between a mobile device of a field technician on site near the apparatus and a remotely located IT support personnel).

As a result, when the first field technician is replaced by a second field technician, the voice call can easily be transferred to a mobile device of the second field technician with an NFC transfer call function. The NFC transfer call function may allow the mobile device of the first field technician to transfer an authentication code and connection information to the mobile device of the second field technician. The information can then be used to establish the same connection to the apparatus. The mobile device of the first field technician can be disconnected and the second field technician may continue the voice call with the IT support personnel via the connection to the apparatus and another connection between the apparatus and the endpoint device of the IT support personnel.

Figure 1:
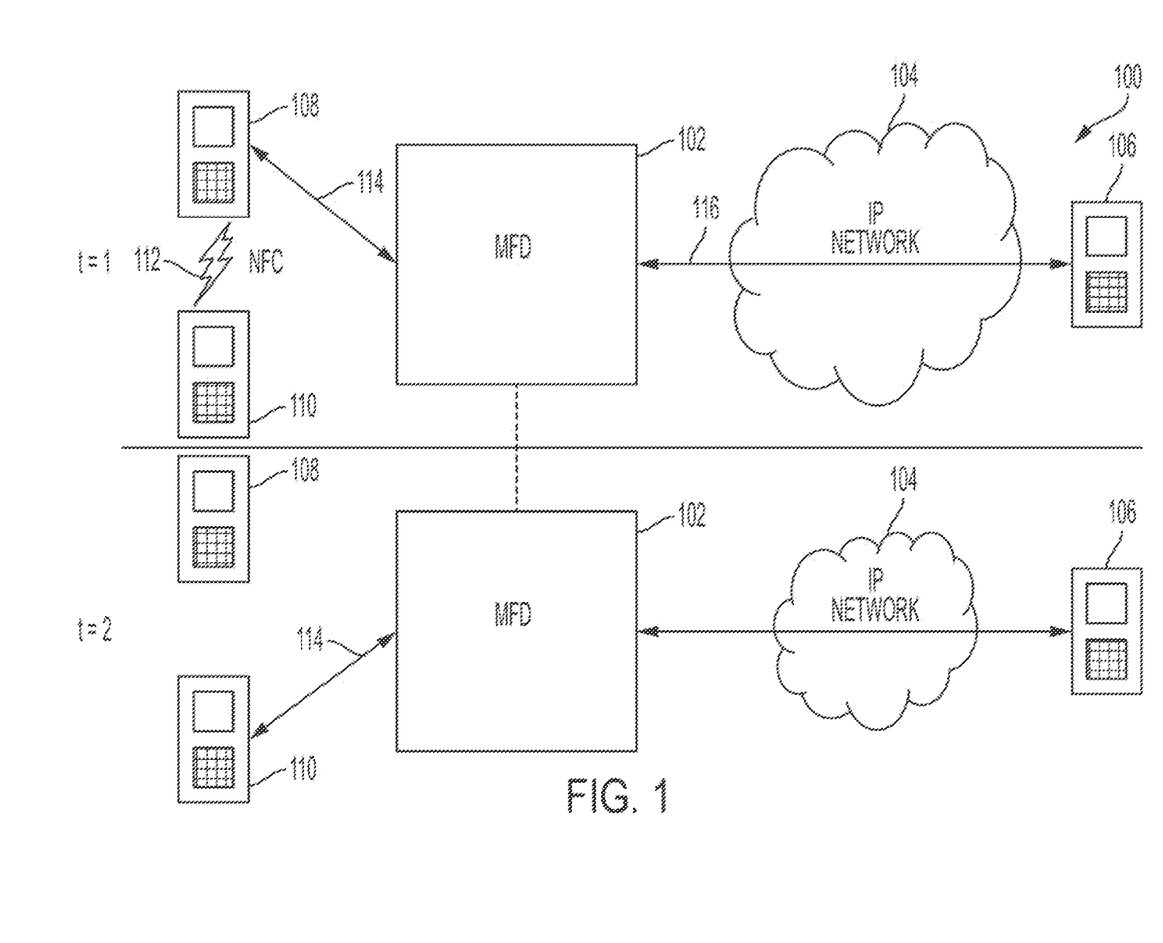
FIG. 1 illustrates a block diagram of an example network that includes a multi-function device (MFD) with mobile phones that provide NFC call transfer functions in accordance with the present disclosure.

FIG. 1 illustrates an example network 100 of the present disclosure. In one embodiment, the network 100 may include an apparatus 102, an Internet protocol (IP) network 104, a first endpoint device 106, a second endpoint device 108, and a third endpoint device 110. In one embodiment, the apparatus 102 may be a multi-function device (MFD). For example, the apparatus 102 may be able to perform print, copy, fax, scan, and email document functions.

Figure 2:
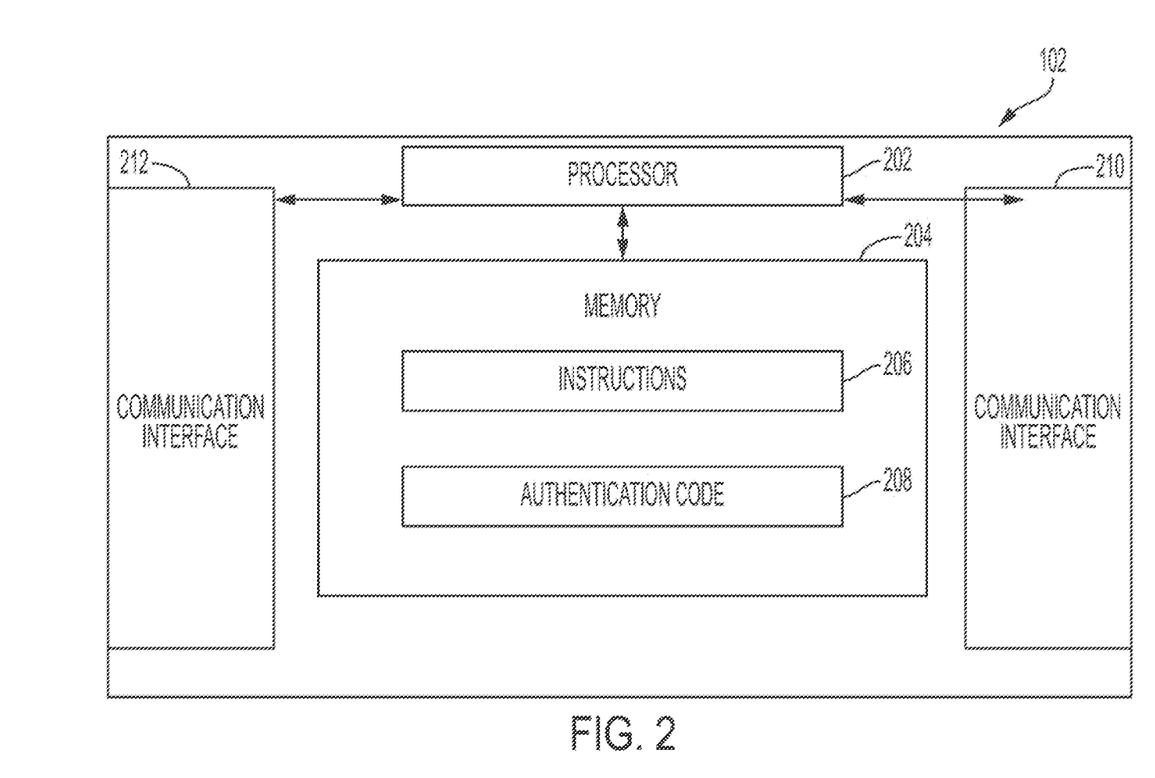
FIG. 2 illustrates a block diagram of an example MFD of the present disclosure.

FIG. 2 illustrates a block diagram of an example of the apparatus 102. In one embodiment, the apparatus 102 may include a processor 202, a memory 204, a first communication interface 210, and a second communication interface 212. The processor 202 may be communicatively coupled to the memory 204, the first communication interface 210, and the second communication interface 212. The processor 202 may control operation of and/or transmit/receive data for processing via the first communication interface 210 and the communication interface 212.

In one embodiment, the first communication interface 210 may be to establish a first communication path 116 between the apparatus 102 and the first endpoint device 106 via the IP network 104. For example, the first communication interface 210 may be an Ethernet connection, a fax over IP connection that uses an RJ-111 connection, or a cellular radio.

In one embodiment, the second communication interface 212 may be to establish a second communication path 114 between the apparatus 102 and the second endpoint device 108. The second communication interface 212 may be a local communication interface, such as a local Wi-Fi radio, a Bluetooth radio, and the like.

In one embodiment, the memory 204 may be any type of non-transitory computer readable medium. For example, the memory 204 may be a hard disk drive, a solid state drive, a random access memory, a read only memory, and the like. The memory 204 may store instructions 206 and authentication code 208.

In one embodiment, the instructions 206 may be executed by the processor 202 to perform the functions described herein to transfer a voice call via NFC between the second endpoint device 108 and the third endpoint device 110. For example, the instructions 206 may cause the processor to perform operations that include detecting a request to transfer the second communication path 114 from the second endpoint device 108 to the third endpoint device 110, wherein the request includes information obtained by the third endpoint device 110 via near field communications 112 with the second endpoint device 108, and transferring the second communication path 114 from the second endpoint device 108 to the third endpoint device 110 to disconnect the second endpoint device 108. Further details of the NFC to transfer call functions are described below.

In one embodiment, the authentication code 208 may be an alpha-numeric code that can be provided to the second endpoint device 108 when a request to connect is received. The authentication code 208 may ensure that the communication path 114 is secure and cannot be eavesdropped by hackers or other nearby endpoint devices. A new code may be generated each time a request to establish a communication path is received. In other words, when a request is received from a different endpoint device to establish a new communication path, a new code may be generated and provided such that the different endpoint device is not connected to another communication path to another endpoint device.

Referring back to FIG. 1, the IP network 104 may be any type of communication network that can transfer data using internet protocols. The IP network 104 may be the Internet, for example. The IP network 104 has been simplified for ease of explanation and may include additional network elements that are not shown. For example, the IP network 104 may include firewalls, gateways, switches, border elements, access networks, and the like.

In one embodiment, the first endpoint device 106, the second endpoint device 108, and the third endpoint device 110 may be any type of endpoint devices that can conduct a voice call. For example, the first endpoint device 106 may be a telephone, a mobile telephone, a computer with voice over internet protocol (VoIP) capabilities, and the like.

Figure 3:
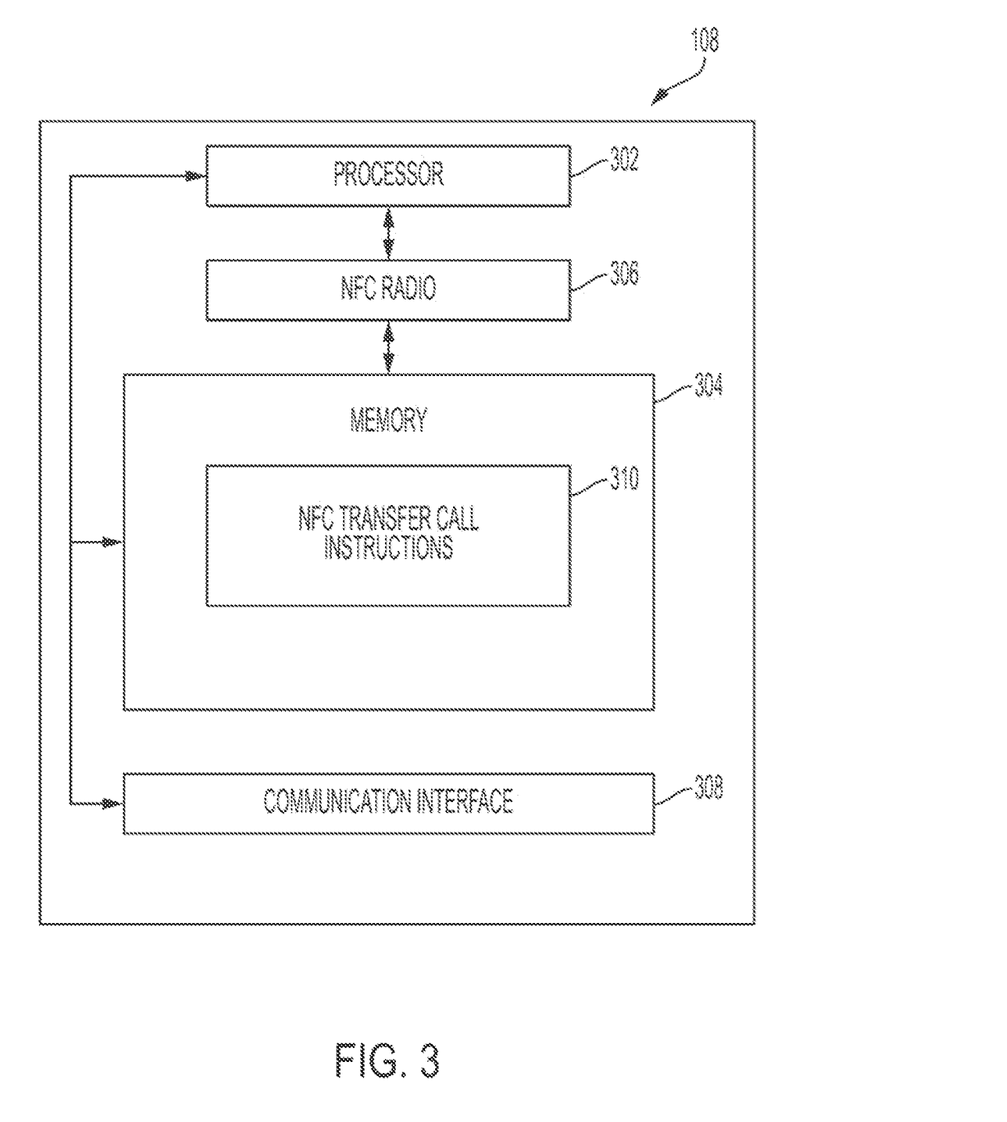
FIG. 3 illustrates a block diagram of an example endpoint device of the present disclosure.

FIG. 3 illustrates an example of the second endpoint device 108. However, it should be noted that FIG. 3 may also be representative of the first endpoint device 106 and the third endpoint device 110.

In one embodiment, the second endpoint device 108 may include a processor 302, a memory 304, a near field communication (NFC) radio 306, and a communication interface 308. The processor 302 may be communicatively coupled to the memory 304, the NFC radio 306, and the communication interface 308.

In one embodiment, the communication interface 308 may include various interfaces. For example, the communication interface 308 may include a Wi-Fi connection interface, a Bluetooth connection interface, a cellular connection interface, and the like. The communication interface 308 may be used to establish the communication path 114 with the apparatus 102.

In one embodiment, the memory 304 may be a non-transitory computer readable medium. For example, the memory 304 may be a hard disk drive, a solid-state drive, a random access memory, a read only memory, and the like. The memory 304 may store NFC transfer call instructions 310. The NFC transfer call instructions 310 may be a third-party application executed on the second endpoint device 108 or may be a feature that is part of the operating system (OS) of the second endpoint device 108.

In one embodiment, the NFC transfer call instructions 310 may allow the communication path 114 to the apparatus 102 to be transferred to another endpoint device (e.g., the third endpoint device 110) via NFC using signals exchanged by the NFC radio 306.

In one embodiment, NFC may be defined as a short-range communication. In some instances, the NFC communication may be established with a "tap" between devices. The NFC does not require additional steps to set up a connection, and data may be exchanged over the NFC connection.

Referring back to FIG. 1, in one embodiment, the apparatus 102 may be an MFD. The MFD may be malfunctioning, and a field technician with the second endpoint device 108 may arrive at the location of the MFD to repair the MFD. At a first point in time (t=1), the field technician may call IT support personnel at the first endpoint device 106 via the MFD. For example, the second endpoint device 108 may establish the communication path 114 locally (e.g., via Wi-Fi or Bluetooth) with the MFD 102. The first endpoint device 106 may establish the communication path 116 with the MFD via the IP network 104 (e.g., via a VoIP landline, a fax over IP connection, and the like). Thus, the first endpoint device 106 may establish a voice call with the second endpoint device 108 via the communication paths 116 and 114. In one embodiment, the voice data may be digitized and transmitted across the communication path 116 via the IP network 104 and passed along by the MFD 102 via the communication path 114, and vice versa.

In one embodiment, establishing the voice call between the first endpoint device 106 and the second endpoint device 108 via the MFD may allow error data to be collected and diagnosed from the MFD directly. For example, the MFD may transmit error codes and/or other diagnostic information to the second endpoint device 108 via the communication path 114 and to the first endpoint device 106 via the communication path 116 during the voice call.

In one embodiment, the first field technician may have to leave (e.g., the troubleshooting is taking longer than expected and the first field technician's shift may be ending). As a result, a second field technician may arrive with the third endpoint device 110. The second field technician may not want to call the first endpoint device 106 directly as the second field technician may have to wait on hold for several minutes in a queue.

The present disclosure allows the voice call to the first endpoint device 106 to be transferred to the third endpoint device 110 with an NFC transfer call function of the present disclosure. In one embodiment, the second endpoint device 108 may select an NFC transfer call option on a user interface of the second endpoint device 108 to initiate the transfer of the call.

Figure 4:
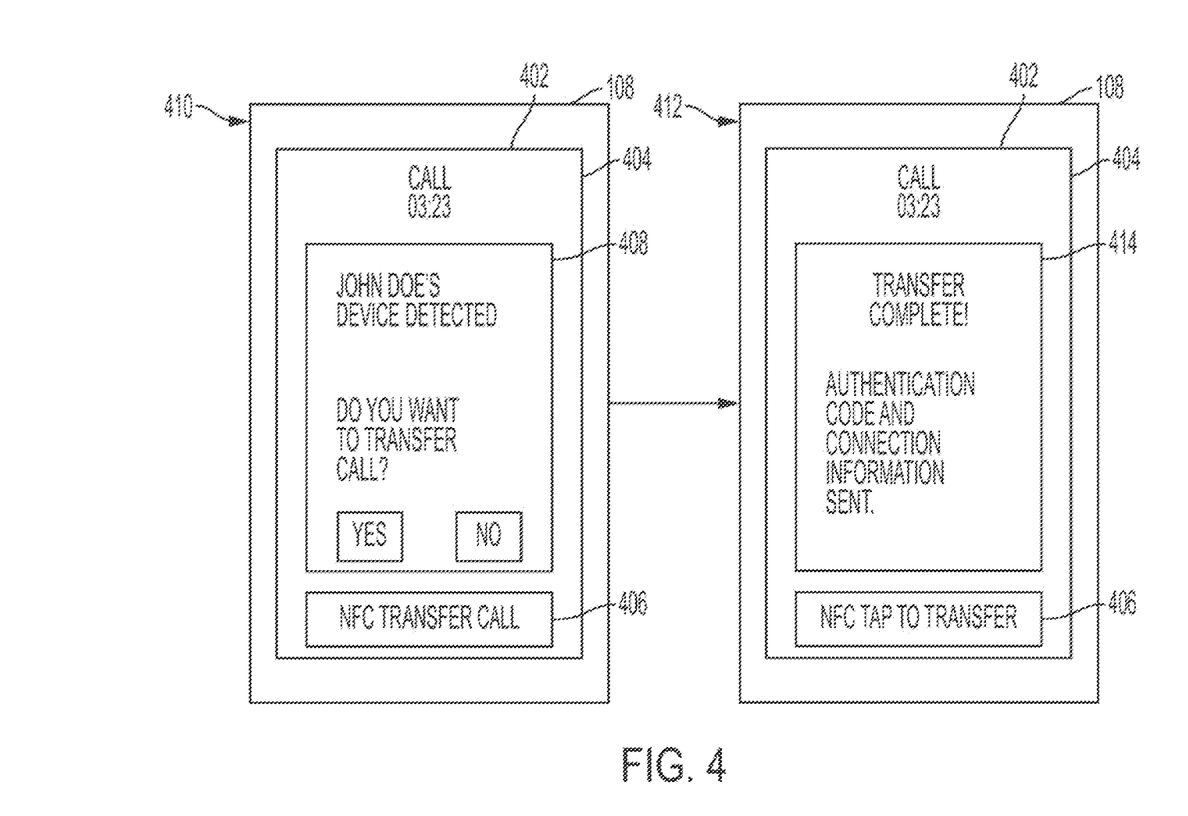
FIG. 4 illustrates example screenshots an endpoint device when the NFC transfer calls feature is activated in the present disclosure.

FIG. 4 illustrates example screenshots 410 and 412 that show how the NFC transfer call function may be executed. The screenshot 410 illustrates a display 402 of the second endpoint device 108. The display 402 may present a graphical user interface (GUI) 404. The GUI 404 may be a touchscreen interface.

In one embodiment, the GUI 404 may include a button 406 that may be selected during a voice call to initiate the NFC transfer call feature. As described in the example above, the first field technician may have to leave, and when the second field technician arrives, the first field technician may select the button 406.

In response, the NFC radio 306 of the second endpoint device 108 may search for a nearby NFC radio of the third endpoint device 110. When the NFC radio of the third endpoint device 110 is detected, a notification 408 may be presented. The notification 408 may prompt a user of the second endpoint device 108 to confirm that the user wants to transfer the current voice call to another user. The identification (e.g., a name of the user, or a name of the user's device) of the third endpoint device 110 that was detected may be presented in the notification 408. If the correct endpoint device was detected, the user may select the "yes" button to initiate the call transfer.

In one embodiment, the third endpoint device 110 may also be presented with a notification to confirm receipt of the transfer. In other words, the NFC call transfer feature may request that both the second endpoint device 108 and the third endpoint device 110 confirm transfer of the voice call.

Although a button 406 is illustrated in FIG. 4, it should be noted that the transfer may also be initiated with a "tap". For example, the second endpoint device 108 may be bumped or tapped against the third endpoint device 110 to initiate the NFC transfer call feature.

In one embodiment, when the NFC transfer call feature is confirmed, the second endpoint device 108 may begin transferring data related to the connection 114 to the third endpoint device 110. For example, the information may include the authentication code 208 associated with the communication path 114, connection information associated with the communication path 114 (e.g., connection type (e.g., Wi-Fi, Bluetooth, and the like), IP address, port assignments, and the like), any error data that was received from the MFD, and so forth.

The third endpoint device 110 may then initiate a connection to the MFD using the connection information received from the second endpoint device 108. The MFD may authenticate the connection request from the third endpoint device 110 with the authentication code 208 that was received from the second endpoint device 108. Once authenticated, the communication path 114 may be transferred to the third endpoint device 110, as shown at a later time t=2 in FIG. 1. Notably, the second endpoint device 108 is disconnected from the voice call and from the MFD, and the communication path 114 is now shown between the third endpoint device 110 and the MFD.

Once the third endpoint device 110 is connected to the MFD, the voice call may continue between the third endpoint device 110 and the first endpoint device 106. In addition, the second field technician may quickly come up to speed on the current progress of the troubleshooting, as all of the error codes/diagnostic information that were received by the second endpoint device 108 are transferred to the third endpoint device 110.

The screenshot 412 illustrates a notification 414 that may be presented in the GUI 404 of the second endpoint device 108 after the communication path 114 is successfully transferred. When the first field technician sees the notification 414, the first field technician may leave or end the call. In one embodiment, the call may be automatically ended on the second endpoint device 108 once the communication path 114 is successfully transferred to the third endpoint device 110.

Thus, the present disclosure allows a secure transfer of a voice call via NFC. Notably, the third endpoint device 110 does not have to reveal his or her telephone number to the second endpoint device 108 to receive the call transfer. Thus, no personal information is provided directly to the second endpoint device 108 of the first field technician. In addition, the IT support personnel on the first endpoint device 106 is not placed on hold. The call transfer may occur seamlessly without interruption to the IT support personnel on the other end of the voice call.

Although an MFD troubleshooting example is described above, the NFC transfer call feature may be used in other examples. For example, a user at home may be troubleshooting a desktop computer or a laptop computer. Thus, the user may call support via the user's desktop computer (e.g., the apparatus 102 may be a desktop computer). Thus, the support personnel may receive error and diagnostic information from the desktop computer. The user may then have to leave, and another family member may connect to the call with his or her endpoint device using the NFC transfer call feature.

Figure 5:
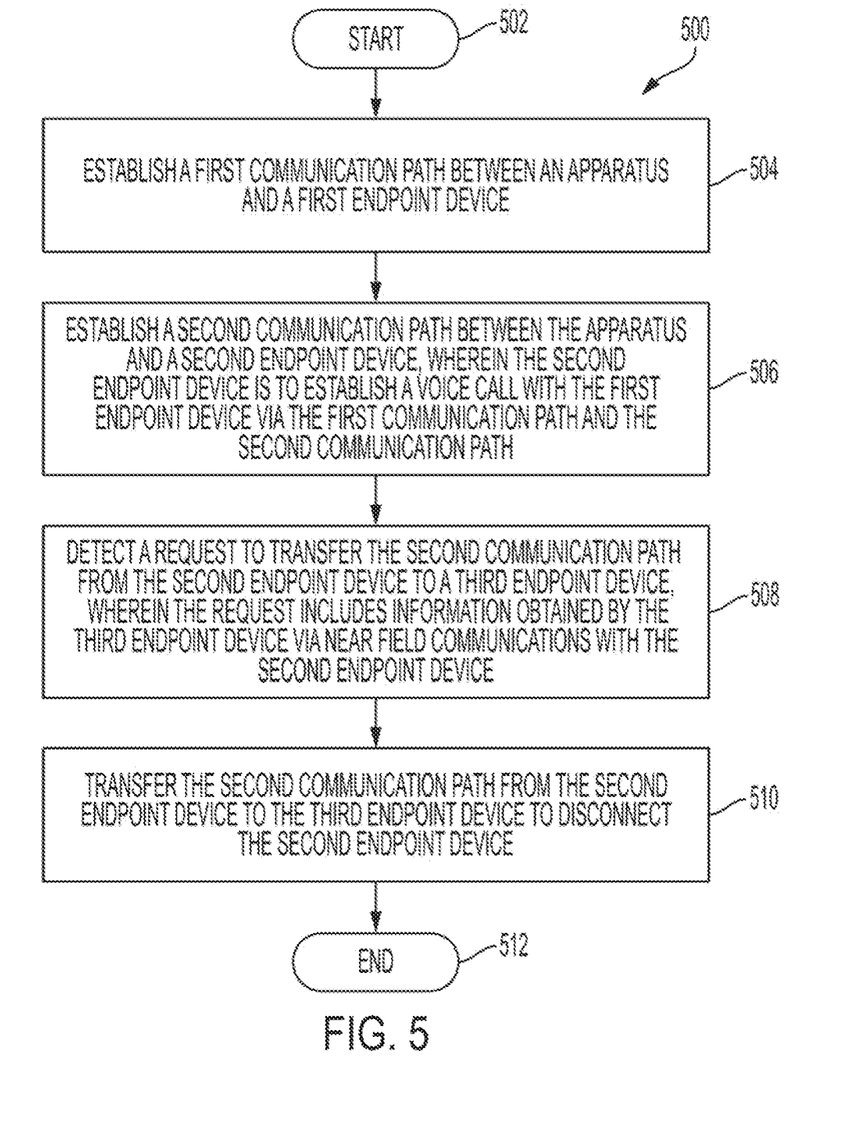
FIG. 5 illustrates a flow chart for a method of transferring calls with NFC of the present disclosure.

FIG. 5 illustrates a flow chart of an example method 500 for a transferring calls with NFC of the present disclosure. In one embodiment, the method 500 may be performed by the MFD 102 or by an apparatus such as the apparatus 600 illustrated in FIG. 6 and discussed below.

In one embodiment, the method 500 begins at block 502. At block 504, the method 500 establishes a first communication path between the apparatus and a first endpoint device. For example, the apparatus may be an MFD or a computing device. The first communication path may be a connection via an IP network. For example, the apparatus and the first endpoint device may be connected via a fax over Internet protocol connection, an Ethernet connection, a cellular connection, a broadband connection, a wireless connection over the Internet, and so forth.

At block 506, the method 500 establishes a second communication path between the apparatus and a second endpoint device, wherein the second endpoint device is to establish a voice call with the first endpoint device via the first communication path and the second communication path. For example, the second endpoint device may be located near the apparatus. The second communication path may be a local connection (e.g., a local Wi-Fi connection, a local area network (LAN) connection, a Bluetooth connection, and the like).

In one embodiment, the voice call may be a voice over internet protocol (VoIP) call between the first endpoint device and the second endpoint device. The voice call may be to troubleshoot the apparatus. In one embodiment, error information and/or diagnostic information generated by the apparatus may be transferred to the first endpoint device and to the second endpoint device via the first communication path and the second communication path.

At block 508, the method 500 detects a request to transfer the second communication path from the second endpoint device to a third endpoint device, wherein the request includes information obtained by the third endpoint device via near field communications (NFC) with the second endpoint device. For example, the user of the second endpoint device may have to leave. A user of the third endpoint device may arrive and have the voice call transferred from the second endpoint device to the third endpoint device.

An NFC call transfer function may be enabled on both the second endpoint device and the third endpoint device. The NFC call transfer function may allow information to be passed between the second endpoint device and the third endpoint device using NFC. Telephone numbers do not need to be exchanged, and the information may be passed securely.

For example, the second endpoint device and the third endpoint device may select an NFC call transfer option during the voice call. In response, the second endpoint device may search for nearby endpoint devices that have also enabled the NFC call transfer option. The second endpoint device may detect the third endpoint device nearby that has the NFC call transfer option activated.

A notification may be presented on both endpoint devices to confirm or acknowledge the transfer of the voice call. The second endpoint device may confirm the transfer of the current voice call and the third endpoint device may confirm receipt of the transfer of the voice call.

Once the transfer of the voice call is confirmed, information for the second communication path may be transferred from the second endpoint device to the third endpoint device. The information may include an authentication code issued by the apparatus to establish the second communication path, a type of connection (e.g., Wi-Fi, Bluetooth, and the like), configuration information to connect to the third endpoint device to the second communication interface of the apparatus via the second communication path (e.g., IP addresses, port assignments for the connection, and the like), and the like.

At block 510, the method 500 transfers the second communication path from the second endpoint device to the third endpoint device to disconnect the second endpoint device. For example, in response to confirmation that the voice call is to be transferred, the third endpoint device may initiate a connection to the apparatus using the information received from the second endpoint device. The third endpoint device may be authenticated with the authentication code received from the second endpoint device. Once authenticated, the second communication path associated with the unique authentication code may be transferred to the third endpoint device.

The second endpoint device may receive confirmation that the transfer was successful. As a result, the second endpoint device may be disconnected from the apparatus. After the second communication path is transferred, the third endpoint device may now continue the voice call with the first endpoint device. As noted above, the third endpoint device may also receive error/diagnostic information or reports from the second endpoint device that were received from the apparatus. As a result, a user may quickly see the progress of the troubleshooting that was performed by a user of the second endpoint device. At block 512, the method 500 ends.

Figure 6:
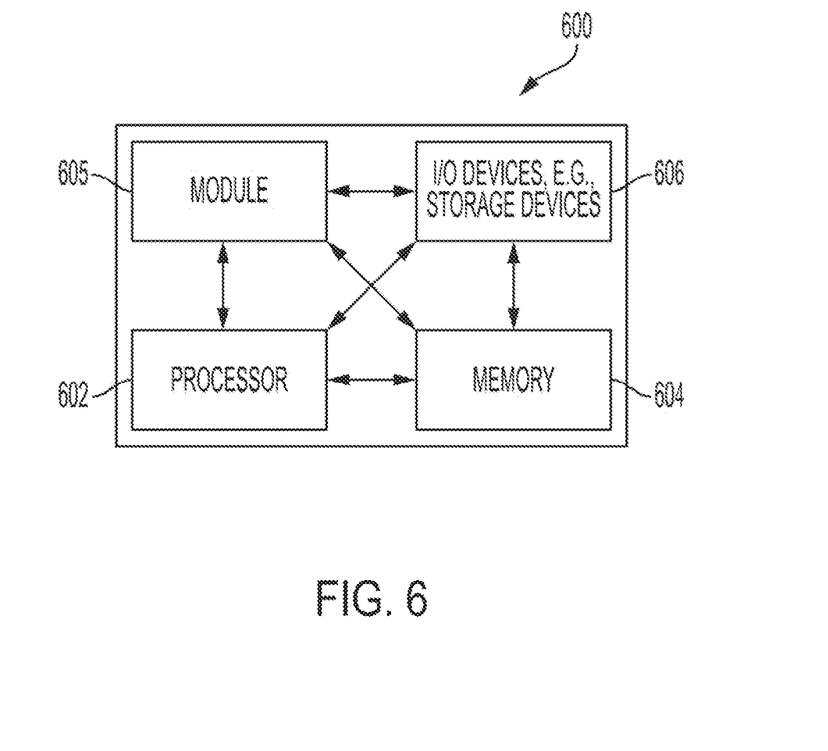
FIG. 6 illustrates a high-level block diagram of an example computer suitable for use in performing the functions described herein.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for transferring calls with NFC, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for transferring calls with NFC (e.g., a software program comprising computer-executable instructions) can be loaded into memory 604 and executed by hardware processor element 602 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for transferring calls with NFC (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-function device (MFD) capable of performing print, copy, fax, scan, and email functions, comprising:
   a first communication interface to establish a first communication path with a first endpoint device over an Internet protocol (IP) network;
   a second communication interface to establish a second communication path with a second endpoint device over a local network connection, wherein the second endpoint device is to establish a voice call with the first endpoint device via the first communication path and the second communication path to troubleshoot the MFD, wherein the MFD sends error data to the first endpoint device via the first communication path and to the second endpoint device via the second communication path;
   a processor to perform one or more of the print, copy, fax, scan, and email functions of the MFD; and
   a non-transitory computer-readable medium storing a plurality of instructions, which when executed by the processor, cause the processor to perform operations comprising:
      detecting a request to transfer the second communication path from the second endpoint device to a third endpoint device, wherein the request includes information obtained by the third endpoint device via near field communications (NFC) with the second endpoint device, wherein the information includes an authentication code generated by the MFD and provided by the third endpoint device;
      authenticating the third endpoint device based on the authentication code; and
      transferring the second communication path from the second endpoint device to the third endpoint device to disconnect the second endpoint device.

2. The MFD of claim 1, wherein the first communication path uses a fax over IP connection.

3. The MFD of claim 1, wherein the local network connection comprises a Wi-Fi connection or a Bluetooth connection.

4. The MFD of claim 1, wherein the information included in the request further includes, a type of connection and configuration information to connect the third endpoint device to the second communication interface of the MFD via the second communication path.

5. A method, comprising:
   establishing, via a processor of a multi-function device (MFD) capable of performing print, copy, fax, scan, and email functions, a first communication path between the MFD and a first endpoint device over an Internet protocol (IP) network;
   establishing, via the processor, a second communication path between the MFD and a second endpoint device over a local network connection, wherein the second endpoint device is to establish a voice call with the first endpoint device via the first communication path and the second communication path to troubleshoot the MFD, wherein the MFD sends error data to the first endpoint device via the first communication path and to the second endpoint device via the second communication path;
   detecting, via the processor, a request to transfer the second communication path from the second endpoint device to a third endpoint device, wherein the request includes information obtained by the third endpoint device via near field communications (NFC) with the second endpoint device, wherein the information includes an authentication code generated by the MFD and provided by the third endpoint device;
   authenticating, via the processor, the third endpoint device based on the authentication code; and
   transferring, via the processor, the second communication path from the second endpoint device to the third endpoint device to disconnect the second endpoint device.

6. The method of claim 5, wherein the first communication path uses a fax over IP connection.

7. The method of claim 5, wherein the local network connection comprises a Wi-Fi connection or a Bluetooth connection.

8. The method of claim 5, wherein the information included in the request further includes a type of connection and configuration information to connect the third endpoint device to the second communication interface of the MFD via the second communication path.

9. The method of claim 5, wherein the information obtained by the third endpoint device via the NFC with the second endpoint device includes a current error status of the MFD.

10. The method of claim 5, wherein the request to transfer is initiated by a selection of a NFC transfer call option on the second endpoint device and the third endpoint device.

11. A method, comprising:
   establishing a first communication path between a multi-function device (MFD) capable of performing print, copy, fax, scan, and email functions and a first endpoint device via an Internet protocol (IP) network;
   establishing a second communication path between the MFD and a second endpoint device via a local network connection, wherein the second endpoint device is to establish a voice call with the first endpoint device via the first communication path and the second communication path to troubleshoot the MFD, wherein the MFD sends error data to the first endpoint device via the first communication path and to the second endpoint device via the second communication path;
   performing an NFC transfer call function, via a third endpoint device, on the second endpoint device to transfer the voice call with the first endpoint device to the third endpoint device;
   transferring an authentication code generated by the MFD and connection information associated with the second communication path to the third endpoint device via the NFC transfer call function;
   authenticating, via the MFD, the third endpoint device based on the authentication code; and
   establishing the second communication path between the MFD and the third endpoint device via the authentication code and the connection information provided by the third endpoint device to establish the voice call between the first endpoint device and the third endpoint device via the first communication path and the second communication path.

12. The method of claim 11, wherein the performing the NFC transfer call function further comprises:
   presenting a notification on a display of the second endpoint device and on a display of the third endpoint device to transfer the voice call by transferring the second communication path; and receiving confirmation from both the second endpoint device and the third endpoint device to transfer the voice call.

\* \* \* \* \*